US012452692B2

(12) United States Patent
Dong et al.

(10) Patent No.: US 12,452,692 B2
(45) Date of Patent: Oct. 21, 2025

(54) ELASTIC COOPERATIVE INFERENCE ARCHITECTURE AND METHOD FOR UAV CLUSTER

(71) Applicant: NANJING UNIVERSITY OF AERONAUTICS AND ASTRONAUTICS, Nanjing (CN)

(72) Inventors: Chao Dong, Nanjing (CN); Yuben Qu, Nanjing (CN); Hao Sun, Nanjing (CN); Feiyu Wu, Nanjing (CN); Weiqing Ren, Nanjing (CN); Qihui Wu, Nanjing (CN); Lei Zhang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 519 days.

(21) Appl. No.: 17/979,008

(22) Filed: Nov. 2, 2022

(65) Prior Publication Data
US 2024/0080679 A1 Mar. 7, 2024

(30) Foreign Application Priority Data
Sep. 6, 2022 (CN) .......................... 202211083483.7

(51) Int. Cl.
*H04W 16/26* (2009.01)
(52) U.S. Cl.
CPC .................. *H04W 16/26* (2013.01)

(58) Field of Classification Search
CPC ...... H04W 16/26; H04W 24/02; H04W 84/20
See application file for complete search history.

(56) References Cited

U.S. PATENT DOCUMENTS

| 10,893,107 | B1* | 1/2021 | Callari | G06F 18/2115 |
|---|---|---|---|---|
| 2019/0289469 | A1* | 9/2019 | Bentley | G06Q 50/40 |
| 2020/0166928 | A1* | 5/2020 | Sudarsan | G05D 1/0088 |
| 2021/0011494 | A1* | 1/2021 | Artemjonoks | G05D 1/0044 |

* cited by examiner

*Primary Examiner* — Yemane Mesfin
*Assistant Examiner* — Salma Ayad
(74) *Attorney, Agent, or Firm* — Addison D. Ault; IPGentleman Intellectual Property Services, LLC

(57) ABSTRACT

An elastic cooperative inference architecture and method for UAV cluster can dynamically update the scheduling policy according to the status of each node, and can deal with the failure of some nodes. In addition, the elastic cooperative inference architecture and method can process larger scale complex models on the embedded devices with limited performance carried by UAVs by means of cooperative inference, so as to improve the accuracy of intelligent applications. At the same time, the elastic cooperative inference architecture and method can adaptively update the allocation strategy when some nodes are unavailable or recovered, and improve the survivability of UAV cluster through elastic coordination.

3 Claims, 4 Drawing Sheets

ELASTIC COOPERATIVE INFERENCE ARCHITECTURE AND METHOD FOR UAV CLUSTER

CROSS REFERENCE TO THE RELATED APPLICATIONS

This application is based upon and claims priority to Chinese Patent Application No. 202211083483.7, filed on Sep. 6, 2022, the entire contents of which are incorporated herein by reference.

TECHNICAL FIELD

The invention relates to the edge intelligence technology field of unmanned aerial vehicle (UAV) cluster, in particular to the elastic cooperative inference architecture and method for UAV cluster.

BACKGROUND

Due to the outstanding advantages of UAVs such as low cost, high flexibility and proximity to ground objects, more and more artificial intelligence applications have been carried out on UAVs. For example, the use of UAV for object detection can effectively make up for the shortcomings of satellite and manned aviation remote sensing and other detection technologies, and detect objects rapidly and accurately from dynamic and changeable environments in a short time. It plays an important role in both military and civil fields.

Although UAVs are ideal platforms for carrying AI applications, they can only support the inference of some lightweight models due to the limited onboard resources of UAVs. In the traditional method, the UAV is only used as the data acquisition device, and the data is transmitted to the powerful cloud data center for processing in the way of central computing. However, the transmission of long-distance wide area network will cause large delay and network fluctuation, which is not suitable for applications with high real-time requirements. Therefore, moving the inference to the edge, where the data is generated, becomes a good approach. However, due to the limited resources of UAV platform, a single node cannot conduct large-scale model inference, which will affect the effect of UAV application. The multi-machine cooperative architecture can effectively expand the inferential network scale, which is a major development direction of UAV edge intelligence.

However, there are still some challenges in the current cooperative inference architecture:
1. The fixed scheduling strategy cannot adapt to the high dynamic changes in the computing and memory capabilities of each UAV node.
2. When some UAV nodes are unavailable, the whole application will crash.

SUMMARY

In view of the defects of the prior art, the present invention aims to provide an elastic cooperative inference architecture and method for UAV cluster, through which the complex neural network inference task in the intelligent application of UAV can be assigned to multiple UAVs for cooperative execution. Different from the situation that the scheduling strategy of the current cooperative inference architecture is fixed and unable to deal with node failure, the architecture proposed in the present invention can dynamically update the scheduling strategy according to the changes of the environment, and can timely deal with the failure of some nodes, which is an elastic cooperative inference architecture in a real sense. Through the architecture of the invention, the real-time performance and accuracy of intelligent application can be improved, and the destruction resistance of UAV cluster can be greatly improved, so that the intelligent application carried by UAV can better adapt to the UAV network with high dynamic network topology.

In order to achieve the above technical objectives, the invention adopts the following technical scheme:

An elastic cooperative inference architecture and method for UAV cluster, wherein the UAV cluster consists of multiple heterogeneous UAVs with computing capability; wherein, the elastic cooperative inference architecture includes:

In the early stage of inference, a node is selected as the master node;

The master node obtains the performance information and connection of each UAV at each time node;

Multiple exit points are set in multiple parts of the model. The master node adjusts the model size according to the QoS requirements of the inference task, determines the exit point, and can end the model inference in advance to reduce unnecessary calculations;

The master node divides the model or data used for inference according to the performance and connection of each UAV, and transmits the task allocation information and node connection information to each node. It should be noted that the performance measurement of each UAV includes: the UAV's computing power, memory condition, channel quality and any other indicators that can affect the communication and model inference.

It should be noted that a round of cooperative inference under time node t includes:

S1 The UAV i of the master node first measures the performance information $D_{i+1,t}, D_{i+2,t}, \ldots, D_{i+K,t}$ of the available K UAVs. t is the number of time nodes, which is an integer greater than or equal to 1;

S2 The master node adjusts the model size according to the QoS requirements of the inference task, determines the exit point, and assigns the inference task $T_{i+1,t}, T_{i+2,t}, \ldots, T_{i+K,t}$ and transmits the task allocation information and node connection information to each node:

$$T_{i+n,t} = \frac{D_{i+n,t} T_t}{\sum_{k=0}^{K} D_{i+k,t}};$$

Where, $T_{i+n,t}$ represents the inference task assigned to node n at time node t, and $T_t$ represents the total inference task of time node t;

S3 Each node obtains the inferential data according to the assigned task and sends the result to the subsequent nodes.

It should be noted that the elastic cooperative inference architecture also includes coping strategies for a variety of situations:

If a node is unavailable, the master node will reassign tasks and plan the connection relationship of each node. When the node recovers the connection, it will rejoin the task queue for cooperative inference. If the master node is unavailable, a new node will be selected as the master node to ensure the normal allocation of inference tasks.

When the number of nodes is too small to complete the inference of complex neural network model, the lightweight neural network model maintained by single machine is used for inference.

The invention also provides a system for realizing elastic cooperative inference architecture and method for UAV cluster, wherein the UAV cluster is composed of multiple heterogeneous UAVs with computing capability; the system includes a cooperative inference device installed on each UAV. The cooperative inference device includes:

Communication module, which is used to transmit inferential intermediate data between nodes;

Node performance measurement module, which is used to measure the performance metrics of each node;

Scheduler, which is used to dynamically allocate inference tasks of each node according to its performance;

Inference module, which is used to process the tasks assigned by nodes.

The invention has the following beneficial effects:
1. The elastic cooperative inference architecture and method for UAV cluster of the present invention can process more large-scale complex models on the limited performance embedded devices mounted on UAVs through cooperative inference. At the same time, the model size can be adjusted according to the QoS requirements of the inference task, and the model inference can be finished before, which can reduce unnecessary computation and improve the real-time performance and accuracy of intelligent applications.
2. The elastic cooperative inference architecture and method for UAV cluster of the present invention can adaptively update the allocation strategy when the connection of some nodes is unavailable and the connection is restored. And when the number of nodes is too small to complete the inference of complex neural network model, the lightweight neural network model maintained by single machine is used for inference. It improves the survivability of UAV cluster and makes the intelligent application carried by UAV better adapt to the UAV network with high dynamic network topology. It is elastic cooperative inference in the real sense.

DETAILED DESCRIPTION OF THE EMBODIMENTS

Figure 1:
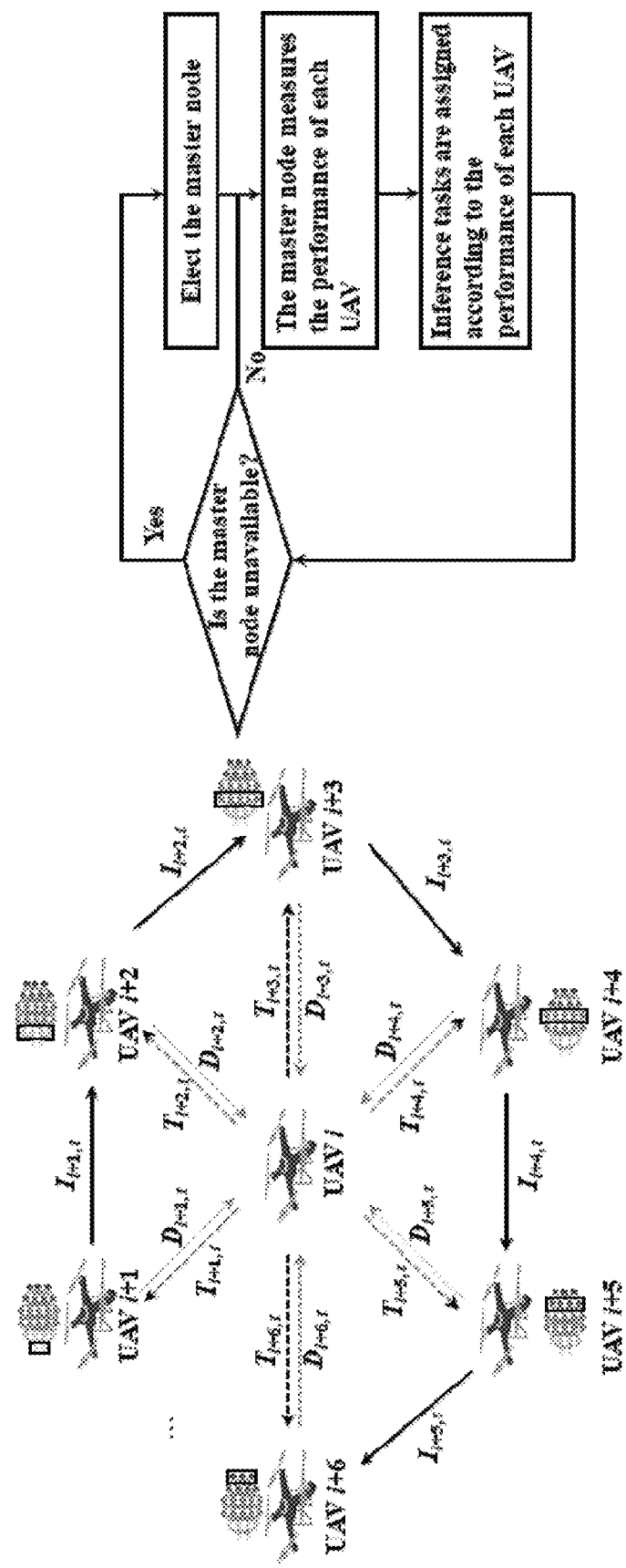
FIG. 1 is the flowchart and corresponding architecture diagram of the elastic cooperative inference architecture for UAV cluster of the embodiment of the invention.

The present invention is further elaborated in combination with embodiments as follows. These embodiments are intended only to illustrate the invention and not to limit the scope of the invention. Any non-material changes and substitutions made by technicians in this field on the basis of the invention are within the scope of protection required by the invention.

The invention is an elastic cooperative inference architecture and method for UAV cluster, wherein the UAV cluster consists of multiple heterogeneous UAVs with computing capability; Wherein, the elastic cooperative inference architecture includes:

In the early stage of inference, a node is selected as the master node;

The master node obtains the performance information and connection of each UAV at each time node;

Multiple exit points are set in multiple parts of the model. The master node adjusts the model size according to the QoS requirements of the inference task, determines the exit point, and can end the model inference in advance to reduce unnecessary calculations;

The master node divides the model or data used for inference according to the performance and connection of each UAV, and transmits the task allocation information and node connection information to each node. Furthermore, in the present invention, the performance measurement of each UAV includes: the UAV's computing power, memory condition, channel quality and any other indicators that can affect the communication and model inference.

Furthermore, a round of cooperative inference under node t at any time of the invention includes:

S1 The UAV i of the master node first measures the performance information $D_{i+1,t}, D_{i+2,t}, \ldots, D_{i+K,t}$ of the available K UAVs. t is the number of time nodes, which is an integer greater than or equal to 1;

S2 The master node adjusts the model size according to the QoS requirements of the inference task, determines the exit point, and assigns the inference task $T_{i+1,t}, T_{i+2,t}, \ldots, T_{i+K,t}$ and transmits the task allocation information and node connection information to each node:

$$T_{i+n,t} = \frac{D_{i+n,t} T_t}{\sum_{k=0}^{K} D_{i+k,t}};$$

Where, $T_{i+n,t}$ represents the inference task assigned to node n at time node t, and $T_t$ represents the total inference task of time node t;

S3 Each node obtains the inferential data according to the assigned task and sends the result to the subsequent nodes.

Furthermore, the elastic cooperative inference architecture of the invention also includes coping strategies for a variety of situations:

If a node loses the connection, the master node will reassign tasks and plan the connection relationship of each node. When the node recovers the connection, it will rejoin the task queue for cooperative inference. If the master node is unavailable, a new node will be selected as the master node to ensure the normal allocation of inference tasks.

When the number of nodes is too small to complete the inference of complex neural network model, the lightweight neural network model maintained by single machine is used for inference.

The invention also provides a system for realizing elastic cooperative inference architecture and method for UAV cluster, wherein the UAV cluster is composed of multiple heterogeneous UAVs with computing capability; the system includes a cooperative inference device installed on each UAV. The cooperative inference device includes:

Communication module, which is used to transmit inferential intermediate data between nodes;

Node performance measurement module, which is used to measure the performance information of each node;

Scheduler, which is used to dynamically allocate inference tasks of each node according to its performance;

Inference module, which is used to process the tasks assigned by nodes.

Embodiment

It should be pointed out that in this embodiment, the UAV cluster is composed of multiple heterogeneous UAVs with computing capability. The intelligent application carried by the UAV cluster is the object detection application. The memory, computing capacity and link between multiple machines of UAV are highly dynamic.

As shown in FIG. 1, UAV i allocates nodes for the initial task, and other UAVs jointly execute the inference task of object detection. A round of cooperative inference under time node t includes the following steps:

(1) The UAV i of the master node first measures the performance metrics $D_{i+1,t}$, $D_{i+2,t}$, . . . , $D_{i+K,t}$ of the available K UAVs;

(2) The master node adjusts the model size according to the QoS requirements of the inference task, determines the exit point, and assigns the inference task $T_{i+1,t}$, $T_{i+2,t}$, . . . , $T_{i+K,t}$ and transmits the task allocation information and node connection information to each node:

$$T_{i+n,t} = \frac{D_{i+n,t} T_t}{\sum_{k=0}^{K} D_{i+k,t}};$$

Where, $T_{i+n,t}$ represents the inference task assigned to node n at time node t, and $T_t$ represents the total inference task of time node t;

(3) Each node obtains the data to be processed according to the assigned task, uses the obtained data for model inference, and sends the results to the subsequent nodes. It should be understood that each UAV node should have the function of assigning inference tasks and inference, so as to change the division of labor and update the allocation strategy when the environment and node status change, so as to realize elastic cooperative inference in a real sense.

Based on the above elastic cooperative inference architecture and method for UAV cluster, the embodiment of the invention also refers to an elastic cooperative inference system for intelligent application of UAV cluster. The UAV cluster is composed of multiple heterogeneous UAVs with computing capability.

The elastic cooperative inference system for UAV cluster intelligence application includes a cooperative inference device installed on each UAV. The cooperative inference device includes:

Communication module, which is used to transmit inferential intermediate data between nodes;

Node performance measurement module, which is used to measure the performance information of each node;

Scheduler, which is used to dynamically allocate inference tasks of each node according to its performance;

Inference module, which is used to process the tasks assigned by nodes.

Figure 2A:
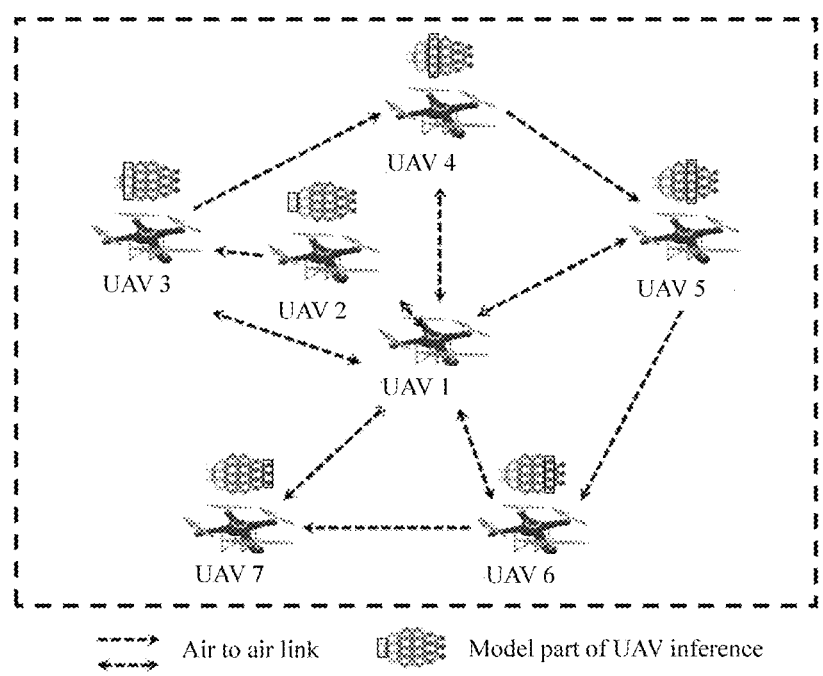
FIG. 2A is an initial scenario diagram of an embodiment of the invention.

FIG. 2A is an initial scenario diagram of an embodiment of the invention. As the initial master node, UAV 1 obtains the performance information of each node and assigns inference tasks to each node. Each node processes part of the total inference task, and then transmits the inference result to the next hop node through the air link.

Figure 2B:
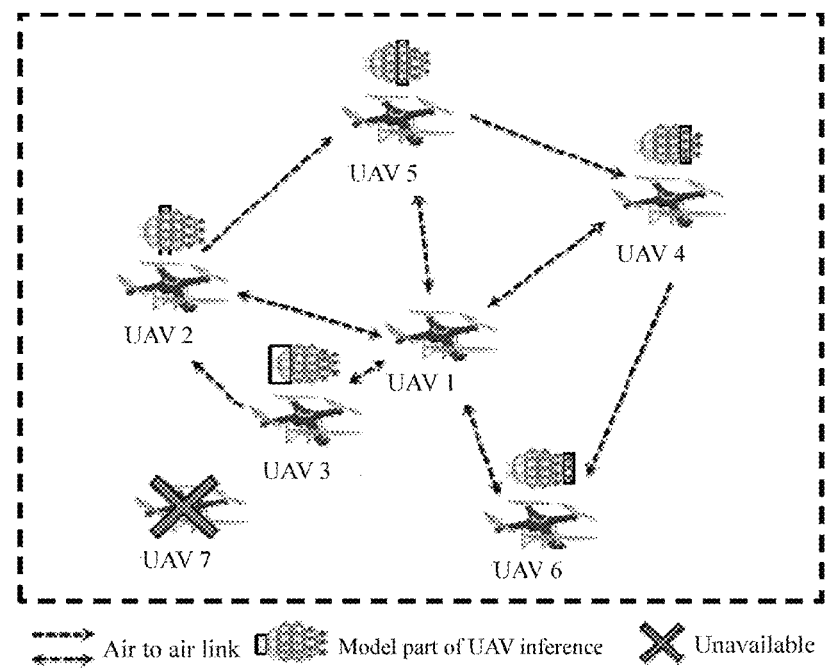
FIG. 2B is the scene diagram of the embodiment of the invention when some UAV nodes are unavailable.

FIG. 2B is a scene diagram of the embodiment of the invention when part of the worker nodes are unavailable. It is assumed that the UAV 7 is unavailable for some reasons and the performance and relative positional relationship of each UAV are changed. Master node UAV 1 detects that UAV 7 is unavailable, and immediately reassigns inference tasks according to the latest state information of the remaining nodes. The inference task performed by UAV 7 is assigned to the remaining nodes, which ensures the normal progress of object detection task.

Figure 2C:
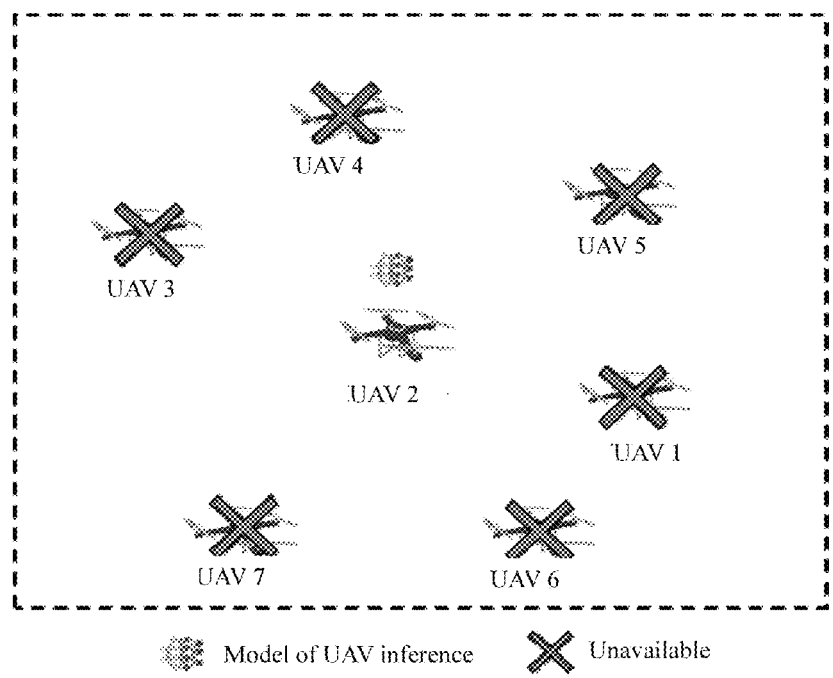
FIG. 2C is a scene diagram of the embodiment of the invention that uses the lightweight neural network model maintained by the single machine to complete the inference task when the complex neural network model cannot be cooperatively processed.

FIG. 2C is a scene diagram of the embodiment of the invention when the complex neural network model cannot be cooperatively processed. It is assumed that all UAVs except UAV 2 are unavailable due to some reasons. At this time, cooperative inference cannot be carried out, so UAV 2 turns into single-machine inference mode and uses the lightweight neural network model maintained by itself to complete the inference task and ensure the normal operation of the application.

Figure 2D:
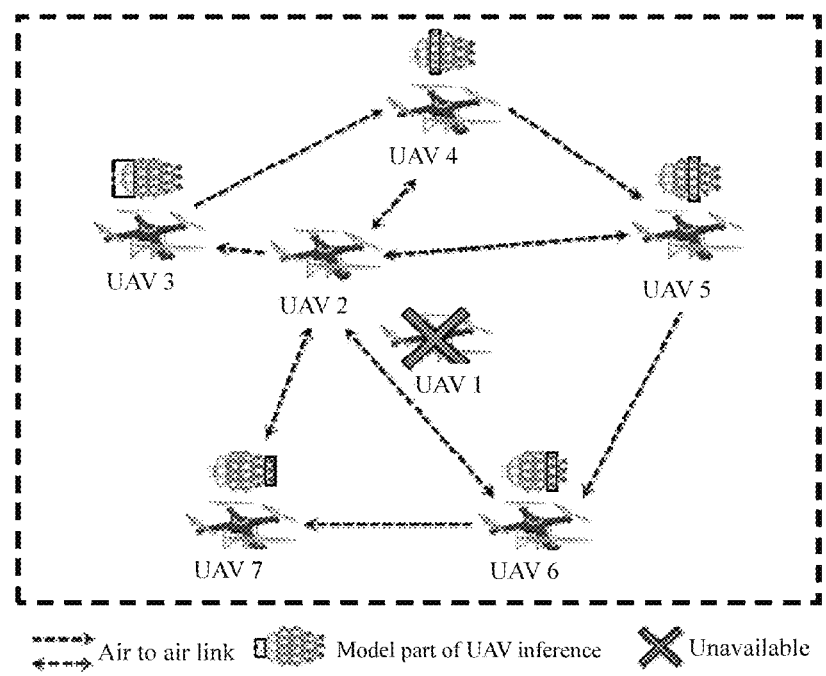
FIG. 2D is a scene diagram of the embodiment of the present invention when the connection of the master node is unavailable.

FIG. 2D is a scene diagram of the embodiment of the invention when the master node is disconnected. When the initial task assignment node UAV 1 is unavailable, UAV 2 is selected as the new master node. UAV 2 obtains the state information of each node and assigns the inference task to each node, which ensures the normal inference task assignment and improves the destruction resistance of the whole system.

The elastic cooperative inference architecture and method for UAV cluster proposed in the invention can adapt well to UAV network with high dynamic network topology, and it brings the following two main advantages when improving the effect of intelligent application in UAV network: On the one hand, the multi-machine cooperative architecture can support larger scale model inference, so that the intelligent application carried by UAV cluster can obtain higher accuracy; on the other hand, the elastic architecture greatly improves the survivability of UAV clusters. When node performance and environment change, the allocation policy can be dynamically adjusted. When some nodes are unavailable, other nodes will share the task of the unavailable node. When the number of nodes is too small to complete the inference of complex neural network model, the lightweight neural network model maintained by single machine is used for inference to ensure the normal operation of intelligent application. In short, the novel feature of the elastic cooperative inference architecture for UAV clusters is that it proposes a cooperative intelligence architecture that fully adapts to the characteristics of UAV networks.

A better concrete embodiment of the invention is described in detail above. It should be understood that ordinary technicians in the field can make many modifications and changes based on the idea of the invention without creative work. Therefore, any technical solution which can be obtained by the technical personnel in the technical field based on the concept of the invention on the basis of prior art by logical analysis, inference or limited experiments shall fall within the scope of protection determined by the claims.

What is claimed is:

1. An elastic cooperative inference architecture for an unmanned aerial vehicle (UAV) cluster, wherein the UAV cluster comprises a plurality of heterogeneous UAVs with computing capability; wherein, the elastic cooperative inference architecture comprises:

in an early stage of inference, a node is selected as a master node;

the master node obtains a performance information and connection of each UAV at each time point;

a plurality of exit points are set in a plurality of parts of a model; the master node adjusts a model size according to QoS requirements of an inference task, determines an exit point, and ends a model inference in advance to reduce unnecessary calculations;

the master node divides the model or data used for inference according to the performance information and connection of each UAV, and transmits task allocation information and node connection information to each node;

wherein a round of cooperative inference under a time point t comprises:

S1: a UAV i of the master node first measures the performance information $D_{i+1,t}, D_{i+2,t}, \ldots D_{i+k,t}$ of available K UAVs, wherein t is a number of time points, and t is an integer greater than or equal to 1;

S2: the master node adjusts the model size according to the QoS requirements of the inference task, determines the exit point, assigns the inference task $T_{i+1,t}, T_{i+2,t}, \ldots, T_{i+k,t}$ and transmits the task allocation information and the node connection information to each node;

wherein $T_{i+n,t}$ represents an inference task assigned to a node n at the time point t, and $T_t$ represents a total inference task of the time point t; and S3: each node obtains inferential data according to an assigned task and sends a result to subsequent nodes.

2. The elastic cooperative inference architecture for the UAV cluster according to claim 1, wherein a performance measurement of each UAV comprises: UAV's computing power, memory condition, channel quality and any other indicators affecting communication and model inference.

3. The elastic cooperative inference architecture for the UAV cluster according to claim 1, wherein the elastic cooperative inference architecture further comprises coping strategies for a variety of situations:

when a node is unavailable, the master node reassigns tasks and plans a connection relationship of each node; when the node recovers a connection, the node rejoins a task queue for cooperative inference; when the master node is unavailable, a new node is selected as the master node to ensure a normal allocation of inference tasks; and when a number of nodes is too small to complete an inference of complex neural network model, a lightweight neural network model maintained by single machine is used for inference.

* * * * *